Oct. 11, 1927.

L. KINSLEY ET AL

PISTON RING

Filed Oct. 29, 1924

Lewis Kinsley
James W. L. Moss
INVENTORS

ATTORNEY

Patented Oct. 11, 1927.

1,645,146

UNITED STATES PATENT OFFICE.

LEWIS KINSLEY, OF PHILADELPHIA, PENNSYLVANIA, AND JAMES W. S. MOSS, OF NEW YORK, N. Y., ASSIGNORS TO HOPE MACHINE COMPANY, OF PHILADELPHIA, PENNSYLVANIA, A CORPORATION OF PENNSYLVANIA.

PISTON RING.

Application filed October 29, 1924. Serial No. 746,508.

This invention relates to expansible piston rings and more particularly to a piston ring of the two-part type.

The general object of the invention is to provide a piston ring construction of the type referred to, with means for prevention of leakage through the ring groove in the piston in addition to the prevention of leakage between the face of the piston ring and the wall of the cylinder; in which the ring-parts are held against relative rotation; which insures against excessive pressure on the inner surface of the ring when liquid fluids are the operating mediums or when such mediums are subject to condensation, and prevents all possibility of said liquid fluid or condensation becoming entrapped behind the inner surface of the ring and, because of its incompressibility, causing excessive wear on the outer surface of the ring and the cylinder wall.

The invention consists of a ring structure formed in two parts, a master ring designed to exert outward pressure against the cylinder surface, and a sealing ring that operates to make the piston ring as a whole leak-proof by engaging the side of the ring groove furthest from the actuating or actuated medium, and at the same time engaging the wall of the cylinder during the movement of the piston by which it is carried.

Other features of the invention will be hereinafter referred to.

Figure 1:
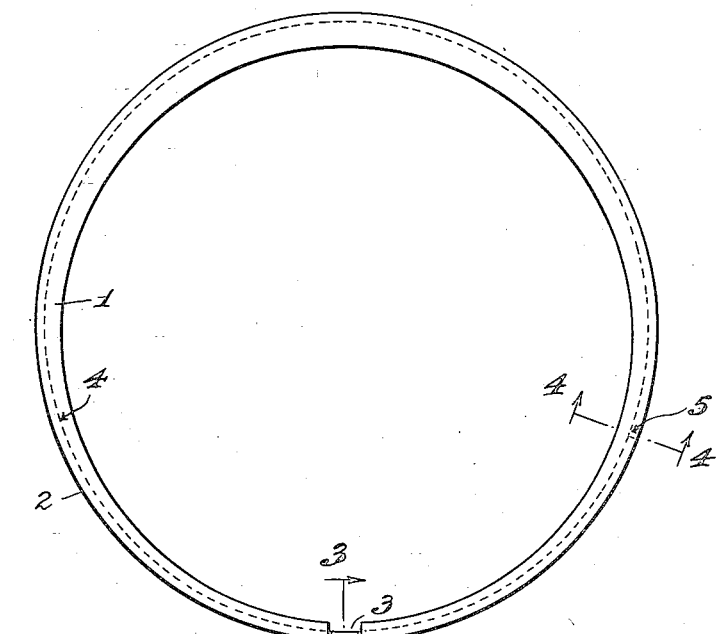
Figure 1 is a plan view of a piston ring embodying the invention.
Figure 2:
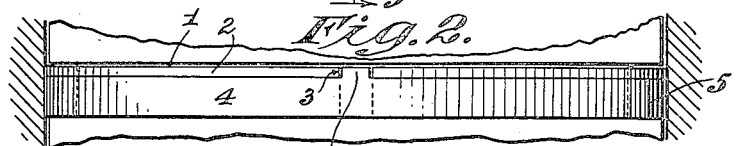
Figure 2 is a view in side elevation of the piston ring shown in Figure 1, showing also its relation to the ring groove of the piston which carries it and to the cylinder in which the latter operates.
Figure 3:
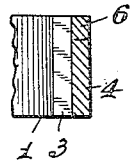
Figure 3 is a view in cross-section taken on the line 3—3 of Figure 1.
Figure 4:
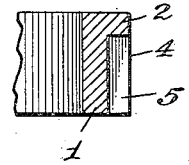
Figure 4 is a view in cross-section taken on the line 4—4 of Figure 1.

Referring to the drawings for a more detailed description of the invention, a two-part piston ring is shown in Figure 1 which is made up of an eccentrically formed master ring 1 preferably L-shaped in cross-section throughout, having an annular radially and outwardly extending flange member 2, and provided with a gap or opening at 3 made by a single saw-cut (or parallel saw-cut) through the ring 1 and its flange 2 to permit expansion of the ring in a known manner. The flange 2 is intended to face the upper or pressure wall of the ring-groove, and the edge of the flange bears against the cylinder wall (see Figure 2). The ring structure also includes an outer or sealing ring 4 rectangular in cross-section, which is concentrically formed and adapted to enclose the master ring beneath the overhanging flange member 2 already referred to. The sealing ring 4 is also provided with a split or opening as at 5, said split 5 being formed by a single saw-cut so that in the free condition this sealing ring 4 is approximately a complete circle with no latent tension, in this respect differing materially from the master ring 1. Ring member 4 and the edge of the body of ring member 1, bear against and will have a sealing relation with the wall of the ring-groove away from the pressure (Figure 2).

The outer or sealing rig 4 is also provided with an axially extending lug 6 which normally rests in the gap 3 between the opposing ends of the flange member 2. The function of the lug 6 is to prevent relative rotation of the ring parts 1 and 4 such as would tend to bring the gaps 3 and 5 thereof into registration, with resultant objectionable leaking of fluid therethrough.

It will be noted that the width of the lug member 6 formed on the edge of the sealing ring 4 is less than the width of the gap 3 in the flange 2 in which the lug rests. The purpose of this is to provide clearances or ports through which incompressible fluid may escape from a position between the inner surface of the ring structure and the top of the ring groove. For instance, during the downward power stroke of the piston pressure is exerted on the top of the master ring 1 and this causes the entire piston ring structure to be pressed downwardly against the lower side of the ring groove in the piston. When this occurs any incompressible fluid trapped behind the ring part 1 will be vented upwardly and outwardly through the clearances between the sides of the lug 6 and the adjacent ends of the flange 2.

Figure 5:
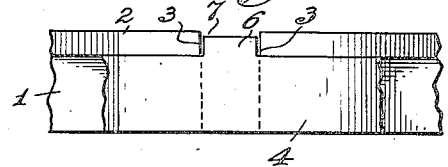
Figure 5 is an enlarged detail of a portion of the device shown in Figure 1 showing a slight modification.

In order to cause the venting operation referred to to be still more effective, in Figure 5 of the drawing the lug 6 is shown to have a less height than that of the annular flange 2 so that a space 7 is provided between the top of the lug 6 and the upper side of the groove in which the ring is seated. This space provides an additional port through which the fluid may escape. By the construction described I succeed in preventing undue deterioration and wear of the rings, and in correspondingly lengthening the period of life of the rings.

Inventors have long stressed the importance of preventing leaking across the face of the ring at the gap but have not realized the much greater importance of preventing leakage through the groove in the piston.

We have found that under the most favorable conditions the leakage through the groove is from 20 to 25 times that possible through the gap and that this proportionate leakage increases rapidly as wear occurs.

This possible source of leakage has been eliminated in our invention, by the sealing member which seals the gap in the master ring not only at the cylinder wall, but at the side of groove away from the pressure. Since, therefore, there is no opening for "across-the-groove" leakage to start from behing the ring, pressure builds up on the pressure side of the ring, continuing to hold it against the far side of the groove even on the downward stroke, since the total pressure holding the ring down is greater than the frictional retardant caused by the face of the ring bearing against the cylinder wall. Leakage is impossible, either across the face of the ring through the gaps, or through the groove. Moreover, pressure is applied only to ring surfaces that are free from joints, so that no leakage can occur between ring members. It is important, in the installation of the ring, that the side of the ring groove away from the pressure, and against which the groove-sealing side of the ring must seat in order to prevent groove leakage, shall be true, without shoulders, and perpendicular to the piston axis. The upper or pressure side of the groove need not be trued up; and ample side clearance is advisable. Obviously, there may be situations in which the venting arrangement may be dispensed with, though we prefer to use it.

We claim:

1. In a two-part piston ring, an expansion ring having an outwardly extending flange thereon, a sealing ring enclosing the unflanged portion of the expansion ring, said rings being provided with gaps, the gap in the flange of said expansion ring being of the same width as the gap in the main body of said expansion ring, a lug on the sealing ring arranged to extend into the gap in the flange of the expansion ring, and said lug having a less width than the width of the gap to provide clearance for the escape of fluid.

2. In a two-part piston ring an expansion ring having an outwardly extending flange thereon, a sealing ring enclosing the unflanged portion of the expansion ring, said rings being provided with gaps, the gap in the flange of said expansion ring being of the same width as the gap in the main body of said expansion ring, a lug on the sealing ring arranged to extend into the gap in the flange of the expansion ring, and the dimensions of said lug being such as to provide clearances in the gap through which fluid may escape.

3. In a two-part piston ring, an eccentrically formed expansion ring having an outwardly extending flange thereon, a concentrically formed sealing ring enclosing the unflanged portion of the expansion ring, said rings being provided with gaps, a lug on the sealing ring arranged to extend into the gap in the flange of the expansion ring, and the width and height of the lug being less than the width and height of the gap in the flange to provide clearance for the escape of fluid.

4. In a two-part piston ring, an expansion ring having an outwardly extending flange thereon, a sealing ring enclosing the unflanged portion of the expansion ring, said rings being provided with gaps, the gap in the flange and flanged portion of the expansion ring being wider than the gap in the remaining body portion of the ring, and a lug on the sealing ring extending into the gap in the flange on the expansion ring, the width and height of the lug being less than the width and height of the gap for the purpose set forth.

In testimony whereof we affix our signatures.

LEWIS KINSLEY.
JAMES W. S. MOSS.